United States Patent
Wybenga et al.

(10) Patent No.: US 7,620,042 B2
(45) Date of Patent: Nov. 17, 2009

(54) APPARATUS AND METHOD FOR INTER-PROCESSOR COMMUNICATIONS IN A MULTIPROCESSOR ROUTING NODE

(75) Inventors: Jack C. Wybenga, Plano, TX (US); Patricia K. Sturm, Marion, IA (US); Mark Lang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 956 days.

(21) Appl. No.: 11/015,739

(22) Filed: Dec. 17, 2004
(Under 37 CFR 1.47)

(65) Prior Publication Data
US 2006/0135167 A1 Jun. 22, 2006

(51) Int. Cl.
*H04L 12/28* (2006.01)
*H04L 12/56* (2006.01)
(52) U.S. Cl. .................................................. 370/389
(58) Field of Classification Search ................. 370/498, 370/351, 401, 398, 389, 386, 236, 246, 419, 370/388, 428, 352; 709/249, 219, 203, 220, 709/238, 245, 247, 201, 246; 713/246, 164, 713/176; 455/445; 714/4, 42; 708/209; 712/208, 34; 711/141, 167; 707/204
See application file for complete search history.

(56) References Cited

U.S. PATENT DOCUMENTS

| | | | | |
|---|---|---|---|---|
| 3,692,989 A * | 9/1972 | Kandiew | ...................... | 714/10 |
| 5,689,506 A * | 11/1997 | Chiussi et al. | ............... | 370/388 |
| 5,987,586 A * | 11/1999 | Byers | ........................... | 712/11 |
| 6,282,633 B1 * | 8/2001 | Killian et al. | ............... | 712/208 |
| 6,393,026 B1 * | 5/2002 | Irwin | ......................... | 370/401 |
| 6,985,483 B2 * | 1/2006 | Mehrotra et al. | ............ | 370/389 |
| 7,007,048 B1 * | 2/2006 | Murray et al. | ............... | 707/204 |
| 7,185,159 B2 * | 2/2007 | Beinet et al. | ................. | 711/163 |
| 7,216,204 B2 * | 5/2007 | Rosenbluth et al. | ......... | 711/141 |
| 7,330,908 B2 * | 2/2008 | Jungck | ......................... | 709/246 |
| 2001/0056553 A1* | 12/2001 | Suzuki et al. | ................... | 714/4 |
| 2002/0009079 A1* | 1/2002 | Jungck et al. | ............... | 370/389 |
| 2002/0026502 A1* | 2/2002 | Phillips et al. | .............. | 709/219 |
| 2003/0172242 A1* | 9/2003 | Uneyama et al. | ............ | 711/167 |
| 2004/0006725 A1* | 1/2004 | Lakshmanamurthy et al. | . | 714/42 |
| 2004/0249803 A1* | 12/2004 | Vankatachary et al. | ......... | 707/3 |
| 2005/0010761 A1* | 1/2005 | Remedios et al. | ........... | 713/164 |
| 2005/0063407 A1* | 3/2005 | Wybenga et al. | ............ | 370/428 |
| 2005/0232264 A1* | 10/2005 | Wybenga et al. | ............ | 370/389 |
| 2005/0265307 A1* | 12/2005 | Wybenga et al. | ............ | 370/351 |
| 2005/0268072 A1* | 12/2005 | Najam et al. | ................... | 712/34 |
| 2006/0126512 A1* | 6/2006 | Jain et al. | .................... | 370/236 |
| 2006/0133389 A1* | 6/2006 | Wybenga et al. | ............ | 370/401 |

\* cited by examiner

*Primary Examiner*—Hong Cho
*Assistant Examiner*—Prenell P Jones (57) ABSTRACT

A router for transferring data packets between external devices. The router comprises: 1) a switch fabric; and 2) R routing nodes coupled to the switch fabric. Each routing node exchanges data packets with the external devices and with other routing nodes via the switch fabric. A first routing node comprises: i) an inbound network processor having a first plurality of microengines that forward incoming data packets from external ports to the switch fabric; ii) an outbound network processor having a second plurality of microengines that forward outgoing data packets from the switch fabric to the external ports; and iii) a plurality of registers for transferring messages between the first and second plurality of microengines. The registers may be 32-bit mailboxes for transferring short messages or 2 Kbyte FIFO buffers for transferring one or more large data packets.

20 Claims, 4 Drawing Sheets

APPARATUS AND METHOD FOR INTER-PROCESSOR COMMUNICATIONS IN A MULTIPROCESSOR ROUTING NODE

TECHNICAL FIELD OF THE INVENTION

The present invention is generally directed to distributed architecture routers and, in particular, to an apparatus for providing communications between processors in multiprocessor routing nodes.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

The Applicants have filed a number of patent applications related to a massively parallel, distributed architecture router in which each of the multiple routing nodes uses two processors—an inbound network processor and an outbound network processor—to forward data packets. The inbound network processor receives data packets from external devices and forwards the received data packets to other routing nodes via the switch fabric and crossbar switch. The outbound network processor receives data packets from the switch fabric and crossbar switch and forwards the received data packets to an external device.

The disclosed inbound and outbound network processors comprise multiple microengines that perform route searches in a shared forwarding table. In an exemplary embodiment, each inbound or outbound network processor comprises a control plane processor (e.g., XScale core processor (XCP)) operating in the control plane and sixteen (16) microengines that route data packets in the data plane. In such an embodiment, the control plane processors of the inbound and outbound network processors perform control plane communications primarily using Local Processor Communications (LPC) over a PCI bus. Also, mechanisms are available inside each network processor to provide internal communications among microengines and control plane processors inside the same network processor.

However, as the data plane functionality becomes distributed between inbound and outbound network processors using shared resources (e.g., shared forwarding table), problems arise with respect to coordinating the allocation and use of these shared resources, as well as synchronizing or coordinating processing across processor boundaries. This situation is further complicated by the fact that there is no mechanism to allow communications directly between microengines in different network processors.

There are two indirect methods for providing some amount of communication between microengines in different network processors. In one method, an originating microengine may send a message to the control plane processor in the same network processor for delivery via LPC to the control plane processor of the destination network processor and subsequent delivery to the terminating microengine. In another method, an originating microengine packetizes the message and hair-pins the packetized message to the destination network processor in the data plane. A microengine in the destination network processor recognizes the message as local and delivers it to the destination microengine. However, both of these methods are highly inefficient.

Moreover, in the previous patent applications filed by the Applicants, the disclosed inbound network processor had only receive interfaces on the external network side and only transmit interfaces on the switch fabric side. Similarly, in the previous patent applications filed by the Applicants, the disclosed outbound network processor had only transmit interfaces on the external network side and only receive interfaces on the switch fabric side.

U.S. patent application Ser. No. 10/665,832, filed on Sep. 19, 2003, entitled "Apparatus and Method for Hairpinning Data Packets in an Ethernet MAC Chip", disclosed a mechanism for transferring a data packet from an inbound network processor directly to the outbound network processor within the same routing node without using the switching modules and cross-bar switch. If a routing node receives a data packet from an external source device, and both the source device and the destination device are coupled to the same routing node, there is no need to transfer the data packet through the switch fabrics and crossbar switch. Instead, the microengines of the network processor simply transmit the received data packet back out to the external network (i.e., like a "hairpin" turn) without using the switch fabric.

However, U.S. patent application Ser. No. 10/665,832 did not disclose a mechanism for performing a "reverse" hairpinning operation whenever a data packet is improperly received from the switching fabric by the outbound network processor. The routers disclosed by the Applicants in previous patent applications sometimes implement draconian route summarization. Such route summarization was disclosed in U.S. patent application Ser. No. 10/832,010, filed on Apr. 26, 2004, entitled "Apparatus and Method for Route Summarization and Distribution in a Massively Parallel Router." This route summarization sometimes leads to misrouting, so that the switch fabric may incorrectly deliver a data packet to the outbound network processor of the wrong routing node.

However, due to the lack of a transmit interface from the outbound network processor back to the switch modules and crossbar switch, the hair-pinning mechanism of U.S. patent application Ser. No. 10/665,832 cannot be used. Moreover, using the control plane processors to transfer the misrouted data packet back to the switch is not feasible because of the high data rate (i.e., 10 Gbps) involved.

Therefore, there is a need in the art for an improved high-speed router that provides direct communications between the microengines of the inbound and outbound network processors of a routing node. There is also a need for a router that enables a misrouted data packet received by the outbound network processor to be transferred directly from the outbound network processor to the inbound network processor for subsequent forwarding back to the switch fabric.

SUMMARY OF THE INVENTION

The present invention provides a mechanism for coordinating shared resources and allows synchronization of processes between the microengines of the inbound and outbound network processors in the route processing modules of a 10 Gbps router. The present invention provides a direct communication method for transferring messages directly between the microengines of both network processors in the same routing node. The present invention is implemented using 32-bit wide mailboxes in the shared memory field programmable gate array (FPGA). In an exemplary embodiment of the present invention, one mailbox serves as an input mailbox for each microengine.

The present invention also provides a direct communication method for transferring (i.e., reverse hairpinning) one or more misrouted data packets from the outbound network processor directly to the inbound network processor. The present invention is implemented using 2 Kbyte buffers in the shared memory field programmable gate array (FPGA). In an exemplary embodiment of the present invention, two buffers are used so that the outbound network processor can alternate between buffers.

Accordingly, to address the above-discussed deficiencies of the prior art, it is a primary object of the present invention to provide a router for transferring data packets between external devices coupled to the router. According to an advantageous embodiment of the present invention, the router comprises: 1) a switch fabric; and 2) R routing nodes coupled to the switch fabric. Each of the R routing nodes is capable of exchanging data packets with the external devices and with other ones of the R routing nodes via the switch fabric. A first of the R routing nodes comprises: i) an inbound network processor comprising a first plurality of microengines capable of forwarding incoming data packets from external ports to the switch fabric; ii) an outbound network processor comprising a second plurality of microengines capable of forwarding outgoing data packets from the switch fabric to the external ports; and iii) a plurality of registers for transferring messages between the first plurality of microengines and the second plurality of microengines.

According to one embodiment of the present invention, the plurality of registers comprises a first plurality of input registers, wherein each one of the first plurality of input registers is capable of transferring a received message from any one of the second plurality of microengines to a dedicated one of the first plurality of microengines.

According to another embodiment of the present invention, each of the first plurality of input registers comprises a full flag that is set when the any one of the second plurality of microengines writes the received message in the each of the first plurality of input registers.

According to still another embodiment of the present invention, the full flag is cleared when the dedicated one of the first plurality of microengines reads the received message from the each of the first plurality of input registers.

According to yet another embodiment of the present invention, the plurality of registers further comprises a second plurality of input registers, wherein each one of the second plurality of input registers is capable of transferring a received message from any one of the first plurality of microengines to a dedicated one of the second plurality of microengines.

According to a further embodiment of the present invention, each of the second plurality of input registers comprises a full flag that is set when the any one of the first plurality of microengines writes the received message in the each of the second plurality of input registers.

According to a still further embodiment of the present invention, the full flag is cleared when the dedicated one of the second plurality of microengines reads the received message from the each of the second plurality of input registers.

According to a yet further embodiment of the present invention, the plurality of registers comprises a first buffer capable of transferring a first data packet from the outbound network processor to the inbound network processor.

In one embodiment of the present invention, the plurality of registers comprises a second buffer capable of transferring a second data packet from the outbound network processor to the inbound network processor.

In another embodiment of the present invention, the first and second data packets are misrouted data packets received from the switch fabric by the outbound network processor.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
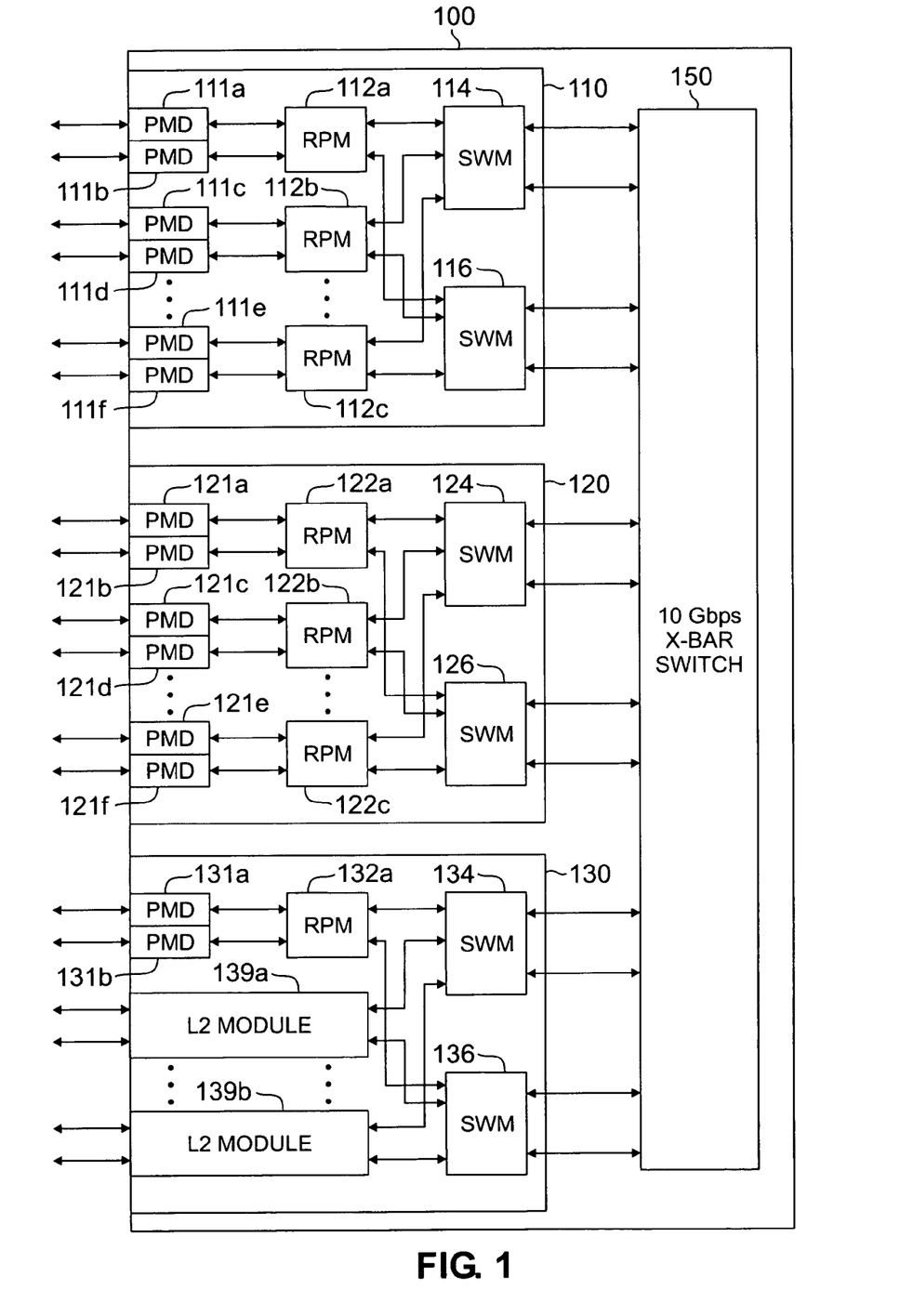
FIG. 1 illustrates an exemplary distributed architecture router that provides direct communications between processor microengines according to the principles of the present invention.

FIG. 1 illustrates exemplary distributed architecture router 100, which provides direct communications between processor microengines according to the principles of the present invention. Router 100 supports Layer 2 switching and Layer 3 switching and routing. Thus, router 100 functions as both a switch and a router. However, for simplicity, router 100 is referred to herein simply as a router. The switch operations are implied.

According to the exemplary embodiment, router 100 comprises N rack-mounted shelves, including exemplary shelves 110, 120 and 130, which are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMs) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). For example, the L2 modules may operate on Ethernet frames and provide Ethernet bridging, including VLAN support. The L2 modules provide a limited amount of Layer 3 forwarding capability with support for small forwarding tables of, for example, 4096 routes.

In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132a, a plurality of physical media device (PMD) modules 131, including PMD modules 131a and 131b, and a plurality of Layer 2 (L2) modules 139, including L2 module 139a and L2 module 139b. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route-processing module (i.e., RPM 112a). The data packet still must be forwarded to RPM 112a, but does not need to be forwarded to crossbar switch 150 or to switch modules 114 and 116.

Figure 2:
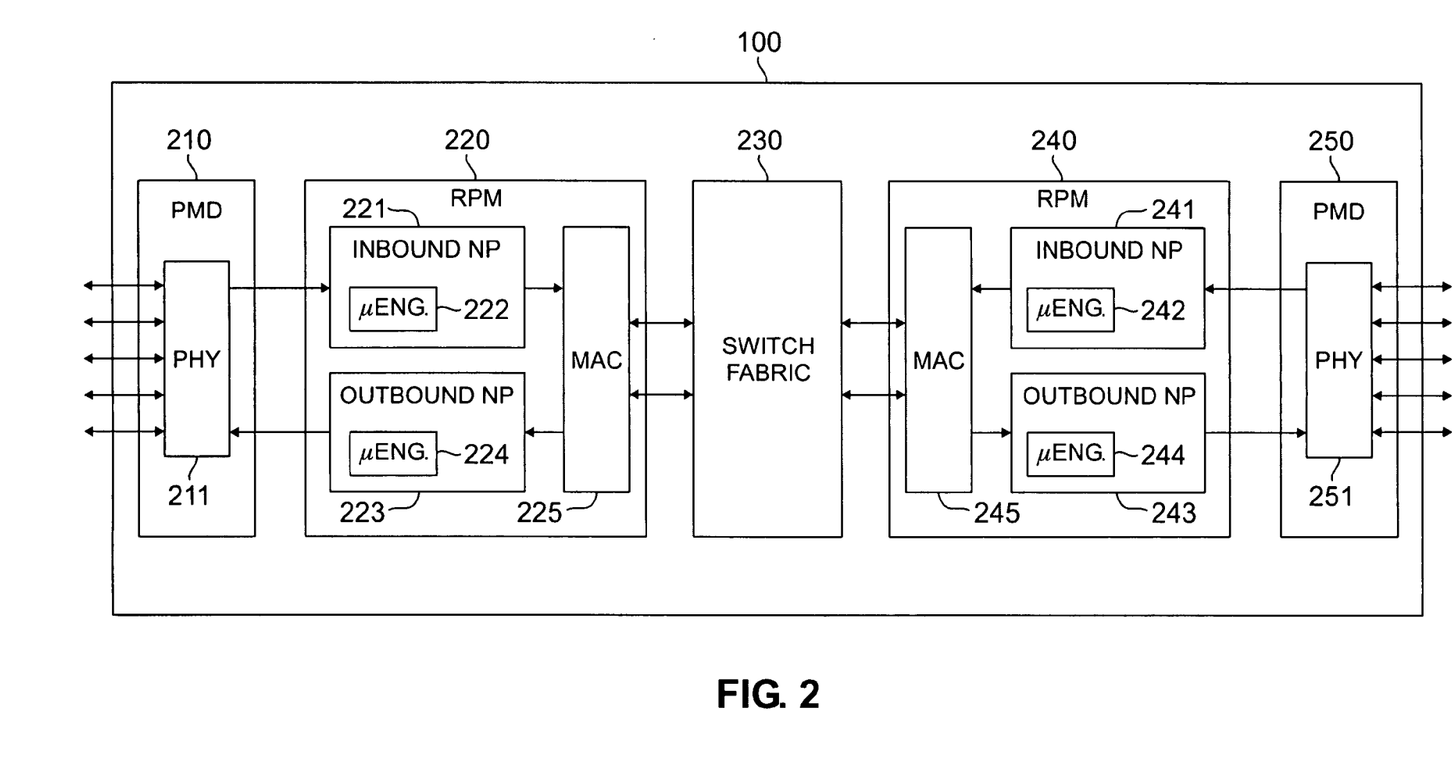
FIG. 2 illustrates selected portions of the exemplary router according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (µEng.) 222 and outbound NP 223 comprises N microengines (µEng.) 224. Similarly, inbound NP 241 comprises N microengines (µEng.) 242 and outbound NP 243 comprises N microengines (µEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a control plane processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup operations.

In order to meet the throughput requirements for line rate forwarding at data rates up to 10 Gbps, it is necessary to split the data plane processing workload among multiple processors, microengines, and threads. The first partitioning splits the workload between two network processors—one operating on inbound data packets from the network interfaces to the switch and the other operating on outbound data packets from the switch to the network interfaces. Each of these processors uses identical copies of the forwarding table.

According to an exemplary embodiment of the present invention, the control and management plane functions (or operations) of router 100 may be distributed between inbound (IB) network processor 221 and outbound network processor 223. The architecture of router 100 allows distribution of the control and management plane functionality among many processors. This provides scalability of the control plane in order to handle higher control traffic loads than traditional routers having only a single control plane processor. Also, distribution of the control and management plane operations permits the use of multiple low-cost processors instead of a single expensive processor. For simplicity in terminology, control plane functions (or operations) and management plane functions (or operations) may hereafter be collectively referred to as control plane functions.

Figure 3:
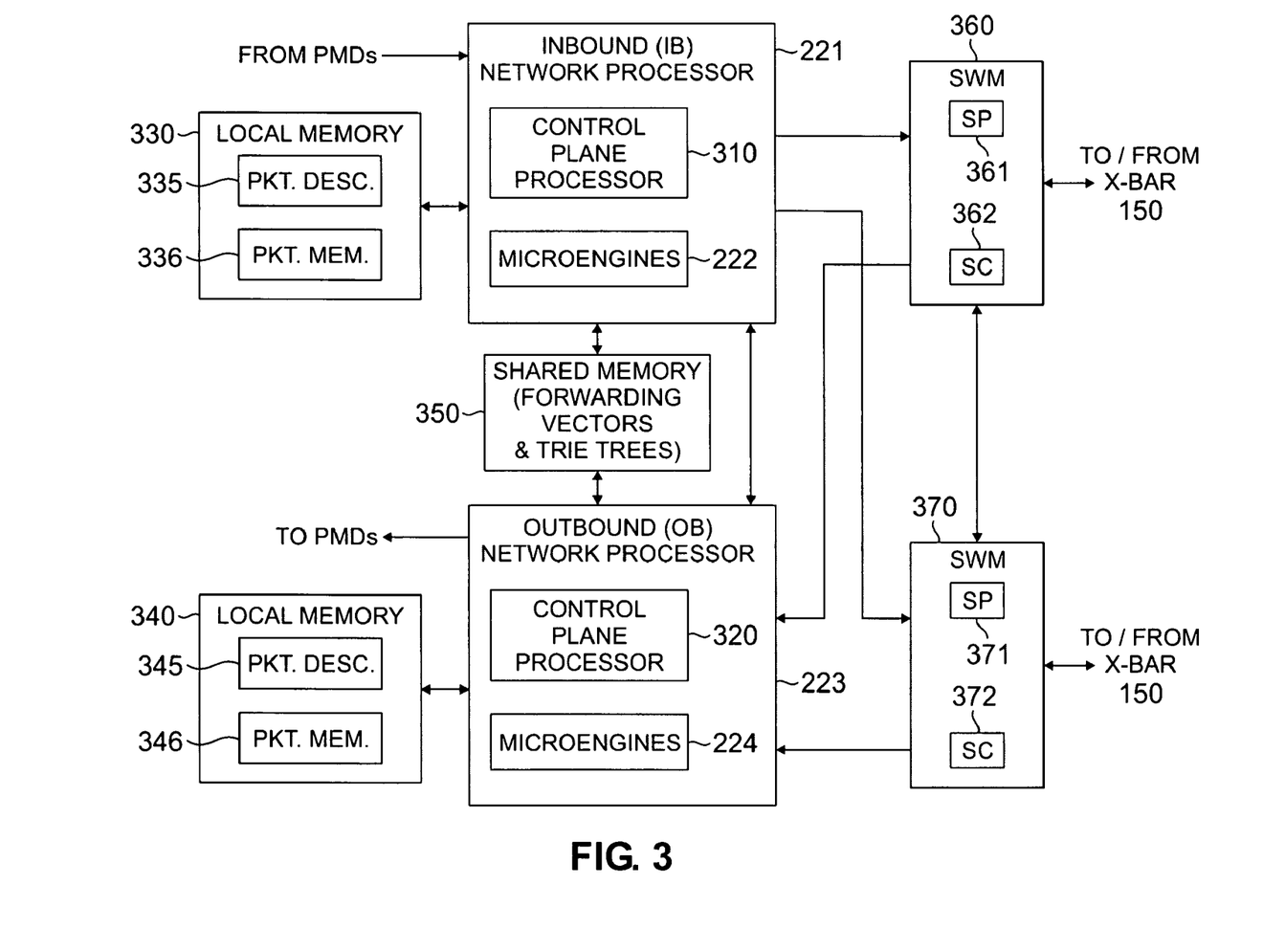
FIG. 3 illustrates the inbound network processor and outbound network processor according to an exemplary embodiment of the present invention.

FIG. 3 illustrates inbound network processor 221 and outbound network processor 223 according to an exemplary embodiment of the present invention. Inbound (IB) network processor 221 comprises control plane processor 310 and microengine(s) 222. Outbound (OB) network processor 223 comprises control plane processor 320 and microengine(s) 224. Inbound network processor 221 and outbound network processor 223 are coupled to shared memory 350, which stores forwarding table information, including forwarding vectors and trie tree search tables.

Inbound network processor 221 is coupled to local memory 330, which contains packet descriptors 335 and packet memory 336. Outbound network processor 223 is coupled to local memory 340, which contains packet descriptors 345 and packet memory 346.

Control and management messages may flow between the control and data planes via interfaces between the control plane processors and data plane processors. For example, control plane processor 310 may send control and management messages to the microengines 222 and control plane processor 320 may send control and management messages to the microengines 224. The microengines can deliver these packets to the local network interfaces or to other RPMs for local consumption or transmission on its network interfaces. Also, the microengines may detect and send control and management messages to their associated control plane processor for processing. For example, microengines 222 may send control and management plane messages to control plane processor 310 and microengines 224 may send control and management messages to control plane processor 320.

Inbound network processor 221 operates under the control of control software (not shown) stored in memory 330. Similarly, outbound network processor 223 operates under the control of control software (not shown) stored in memory 340. According to an exemplary embodiment of the present invention, the control software in memories 330 and 340 may be identical software loads.

Network processors 221 and 223 in router 100 share routing information in the form of aggregated routes stored in shared memory 350. Management and routing functions of router 100 are implemented in inbound network processor 221 and outbound network processor 223 in each RPM of router 100. Network processors 221 and 223 are interconnected through 10 Gbps links to exemplary switch module (SWM) 360 and exemplary switch module (SWM) 370. SWM 360 comprises switch processor 361 and switch controller 362. SWM 370 comprises switch processor 371 and switch controller 372. Multiple switch modules may be interconnected through 10 Gbps links via Rack Extension Modules (REXMs) (not shown).

In order to meet the bi-directional 10 Gbps forwarding throughput of the RPMs, two network processors—one inbound and one outbound—are used in each RPM. Inbound network processor 221 handles inbound (IB) packets traveling from the external network interfaces to switch fabric 230. Outbound network processor 223 handles outbound (OB) packets traveling from switch fabric 230 to the external network interfaces. In an exemplary embodiment of the present invention, control plane processor (CPP) 310 comprises an XScale core processor (XCP) and microengines 222 comprise sixteen microengines. Similarly, control plane processor (CPP) 320 comprises an XScale core processor (XCP) and microengines 224 comprise sixteen microengines.

According to an exemplary embodiment of the present invention, router 100 implements a routing table search circuit as described in U.S. patent application Ser. No. 10/794,506, filed on Mar. 5, 2004, entitled "Apparatus and Method for Forwarding Mixed Data Packet Types in a High-Speed Router." The disclosure of U.S. patent application Ser. No. 10/794,506 is hereby incorporated by reference in the present application as if fully set forth herein. The routing table search circuit comprises an initial content addressable memory (CAM) stage followed by multiple trie tree search table stages. The CAM stage allows searches to be performed on data packet header information other than regular address bits, such as, for example, class of service (COS) bits, packet type bits (IPv4, IPv6, MPLS), and the like.

The use of multiple threads in multiple microengines enables network processors 221 and 223 to modify a data packet during its transit through router 100. Thus, network processors 221 and 223 may provide network address translation (NAT) functions that are not present in conventional high-speed routers. This, in turn, provides dynamic address assignment to nodes in a network. Since network processors 221 and 223 are able to modify a data packet, network processors 221 and 223 also are able to obscure the data packet identification. Obscuring packet identification allows router 100 to provide complete anonymity relative to the source of an inbound packet.

The ability of router 100 to distribute the data packet workload over thirty-two microengines, each capable of executing, for example, eight threads, enables router 100 to perform the additional security and classification functions at line rates up to 10 Gbps. FIG. 3 shows the flow of data through route processing module (RPM) 220. Packets enter RPM 220 through an interface—a network interface (PMD) for inbound network processor (IB NP) 221 and a switch interface for outbound network processor (OB NP) 223. IB NP 221 and OB NP 223 also may receive packets from control plane processors 310 and 320.

Microengines 222 store these data packets in packet memory 336 in local QDRAM (or RDRAM) memory 330 and write a Packet Descriptor into packet descriptors 335 in local memory 330. Similarly, microengines 224 store these data packets in packet memory 346 in local QDRAM (or RDRAM) memory 340 and write a Packet Descriptor into packet descriptors 345 in local memory 340.

A CAM search key is built for searching the initial CAM stages of the search tables in memory 350. The CAM key is built from data packet header information, such as portions of the destination address and class of service (CoS) information and a CAM lookup is done. The result of this lookup gives an index for a Vector Table Entry, which points to the start of a trie tree search table. Other information from the packet header, such as the rest of the destination address and possibly a socket address, are used to traverse the trie tree search table.

The search of the CAM stage and trie tree table results in either in a leaf or an invalid entry. Unresolved packets are either dropped or sent to control plane processors 310 and 320 for further processing. A leaf node gives a pointer to an entry in a forwarding table (i.e., a Forwarding Descriptor) in memory 350. Since shared memory space is limited, these forwarding tables may be located in local memory 330 and 340. Based on the results of the search, the packet is forwarded to the control plane, to another RPM network processor, to an L2 module, or to an output port (i.e., a switch port for IB NP 221 and a network interface port for OB NP 223). The data packet is not copied as it is passed from microengine thread to microengine thread. Only the pointer to the Packet Descriptor must be passed internally. This avoids expensive copies.

According to the principles of the present invention, microengines 222 of inbound network processor (IB NP) 221 may exchange messages directly with microengines 224 of outbound network processor (OB NP) 223 by means of registers (or mailboxes) implemented in a field programmable gate array (FPGA) that is part of the shared memory complex of shared memory 350. Furthermore, microengines 224 of OB NP 223 may "reverse hairpin" a data packet incorrectly received from switch modules (SWM) 360 and 370 by transferring the data packet to microengines 222 of IB NP 221 by means of data buffers implemented in the field programmable gate array (FPGA) of shared memory 350.

Figure 4:
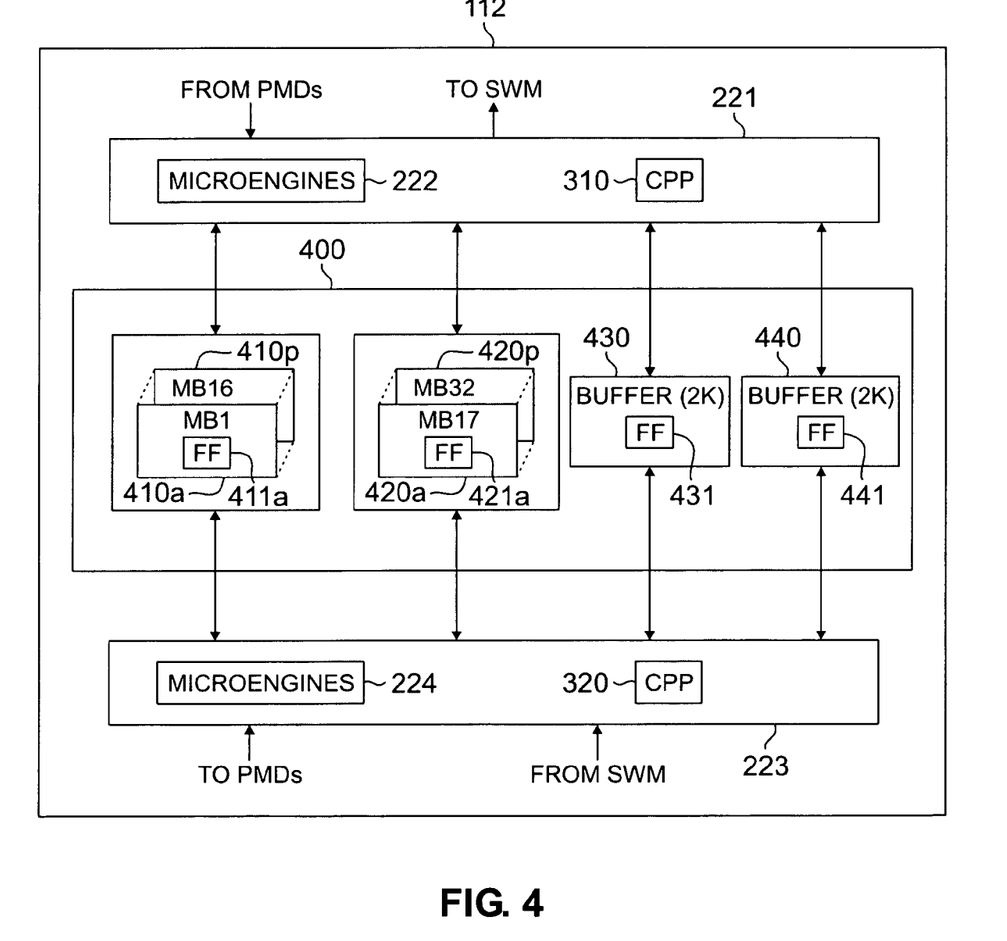
FIG. 4 illustrates a shared memory field programmable gate array in a route processing module for providing direct communications between the microengines of the inbound and outbound network processors according to an exemplary embodiment of the present invention.

FIG. 4 illustrates shared memory field programmable gate array 400 in exemplary route processing module (RPM) 112 for providing direct communications between the microengines of the inbound and outbound network processors according to an exemplary embodiment of the present invention. As in the case of FIG. 3, route processing module (RPM) 112 comprises inbound (IB) network processor (NP) 221 and outbound (OB) network processor (NP) 223. IB NP 221 comprises microengines 222 and control plane processor (CPP) 310. OB NP 223 comprises microengines 224 and control plane processor (CPP) 320.

IB NP 221 and OB NP 223 are shown coupled to field programmable gate array (FPGA) 400. As noted above, each one of inbound network processor 221 and outbound network processor 223 contains sixteen (16) microengines, so that IB NP 221 and OB NP 223 have thirty-two (32) microengines combined. In an exemplary embodiment, FPGA 400 comprises thirty-two memory-mapped registers (or mailboxes), including a first set of sixteen registers 410a-410p and a second set of sixteen registers 420a-420p. Registers 410a-410p are labeled, and may also be referred to as, Mailbox 1 (or MB1) through Mailbox 16 (or MB16). Registers 420a-420p are labeled, and may also be referred to as, Mailbox 17 (or MB17) through Mailbox 32 (or MB32).

IB NP 221 and OB NP 223 use Mailboxes 1-32 for quick, short communications among microengines 222 and 224. According to the exemplary embodiment, each mailbox is 32 bits wide and has an associated full flag (FF). For example, full flag 411a is associated with register 410a (i.e., MB1) and full flag 421a is associated with register 420a (i.e., MB17). Each one of microengines 222 and 224 can read the full flags of all of Mailboxes 1-32. FPGA 400 automatically sets the full flag of Mailbox N when a microengine writes to Mailbox N. FPGA 400 automatically clears the full flag of Mailbox N when a microengine reads from Mailbox N. FPGA 400 initializes the full flags for each mailbox to empty upon reset.

Since registers 410a-p and 420a-p (i.e., Mailboxes 1-32) and their associated full flags are mapped into the memory space of each inbound network processor 221 and outbound network processor 223, the allocation and use of Mailboxes 1-32 is arbitrary and may be defined by software. In FIG. 4, thirty-two mailboxes are implemented to provide each microengine with an associated input mailbox. In an advantageous embodiment of the present invention, control plane processors 310 and 320 also may use Mailboxes 1-32. Furthermore, two mailboxes (34 total) may be associated with control plane processors 310 and 320, namely Mailboxes 33 and 34 (not shown). When this configuration is used, any microengine or control plane processor in IB NP 221 or OB NP 223 may send data to any other microengine or control plane processor (CPP) using the corresponding mailbox.

Coordination of the use of the mailboxes is left to software, which must ensure that a first writing device (microengine or CPP) does not over-write its own previous data and does not over-write the data of a second writing device. This may be partially accomplished by having the writing device check the full flag status to ensure that the full flag is not set before writing data. This is a complete solution if there is only a single writer thread. However, if there are multiple writer threads, a race condition may occur where a mailbox is written by another thread between the time the current thread reads the status and the another thread writes data.

One solution to this race condition is to have FPGA 400 prevent writes when the full flag is set. Writing the data and setting the full flag is an atomic operation in FPGA 400 relative to microengines and CPPs. Thus, if the full flag is set between the check and the write, FPGA 400 blocks the write and sets a failure flag. After each write, the failure flag is checked and another attempt is made if the failure flag is set. If this approach is used, the check before writing may be skipped to save processing and a random delay between attempts may be used, since FPGA 400 prevents any over-writing of data.

FPGA 400 further comprises buffer 430 and buffer 440. In an exemplary embodiment, buffers 430 and 440 are each 2 Kilobyte (2 KB) FIFO registers. Buffer 430 is associated with full flag (FF) 431 and buffer 440 is associated with full flag (FF) 441. Buffers 430 and 440 are used to implement reverse hairpinning of data packets that are misrouted to outbound network processor 223 from the switch fabric.

Each one of buffers 430 and 440 is large enough to hold a maximum-sized data packet with additional overhead space. Each one of buffer 430 and 440 is accessed through a single 32-bit wide memory-mapped location that is used to send packets of up to 2 KB from outbound network processor 223 to inbound network processor 221. Two packet buffers are used to improve throughput. One of packet buffers 430 and 440 may be written while the other one is being read.

Full flag 431 and full flag 441 indicate whether the corresponding buffer is full or empty. OB NP 223 has read access and write access to both of full flags 431 and 441 and IB NP 221 has read-only access to full flags 431 and 441. Full flags 431 and 441 are initialized to empty and the 2 KB FIFOs are flushed by FPGA 400 upon reset.

Outbound network processor 223 may send one or more data packets to inbound network processor 221 at a time using each buffer. If the control software chooses to send only single packets through buffers 430 and 440, then packet delineation is indicated by full flags 431 and 441. If multiple data packets are sent at a time, then the control software must determine packet delineation by packet framing or headers.

Since a packet or group of packets may not use the entire space of buffer 430 or buffer 440, OB NP 223 must set the full flag when the packet or packets are loaded. Since buffers 430 and 440 are implemented as FIFO registers, full flags 431 and 441 are cleared when all data has been read out of the FIFOs.

The control software resides in the microengines of IB NP 221 and OB NP 223. In the case where only single packets are sent at a time through buffers 430 and 440, outbound network processor 430 alternates use of buffers 430 and 440 for each packet. After a reset, the control software may start using either of buffers 430 and 440. When the control software in OB NP 223 has a packet to send to IB NP 221, OB NP 223 sends the packet through the buffer that was used longest ago.

For example, if the control software last sent a data packet through buffer 430, the control software sends the next packet through buffer 440. The control software checks the full flag of the selected buffer. When the full flag is clear, the control software in OB NP 223 writes a packet into the selected buffer using the 32-bit access register. When the entire packet has been written, the control software in OB NP 223 sets the full flag.

The control software in IB NP 221 sees that the full flag is set and reads the data packet through the 32-bit access register. When all of the data is read from the buffer, FPGA 400 clears the full flag. This is an indication to IB NP 221 that the entire packet has been read. While IB NP 221 is reading this packet, OB NP 223 may be writing the next data packet to the other buffer. In order to maintain packet order, IB NP 221 must alternate between reading buffers 430 and 440.

It is noted that in a single packet mode, the full flag may be used for packet delineation. However, the full flag cannot be used to find the end of the packet unless the packets end on 32-bit boundaries. Thus, in the general case, framing and header information must be used to determine the length of the packet to the nearest byte or bit.

If the control software elects to send multiple packets through buffers 430 and 440 at a time, the packet processing is similar. OB NP 223 writes multiple packets to a buffer before setting the full flag and IB NP 221 reads until the full flag is cleared. Alternating between the two buffers is the same. However, multiple packets may be transferred in each step. In this case, packet delineation must be determined by IB NP 221 using framing or packet headers.

Although the present invention has been described with an exemplary embodiment, various changes and modifications may be suggested to one skilled in the art. It is intended that the present invention encompass such changes and modifications as fall within the scope of the appended claims.

What is claimed is:

1. A router for transferring data packets between external devices coupled to said router, said router comprising:
   a switch fabric; and
   R routing nodes coupled to said switch fabric, each of said R routing nodes capable of exchanging data packets with said external devices and with other ones of said R routing nodes via said switch fabric, wherein a first of said R routing nodes comprises:
      an inbound network processor comprising a first plurality of microengines capable of forwarding incoming data packets from external ports to said switch fabric;
      an outbound network processor comprising a second plurality of microengines capable of forwarding outgoing data packets from said switch fabric to said external ports; and
      a plurality of registers for transferring messages between said first plurality of microengines and said second plurality of microengines, said plurality of registers comprising a first plurality of input registers capable of transferring a received message from any one of said second plurality of microengines to a dedicated one of said first plurality of microengines, wherein each of said first plurality of input registers comprises a full flag that is set when said any one of said second plurality of microengines writes said received message in said each of said first plurality of input registers.

2. The router as set forth in claim 1, wherein said full flag is cleared when said dedicated one of said first plurality of microengines reads said received message from said each of said first plurality of input registers.

3. The router as set forth in claim 1, wherein said plurality of registers further comprises a second plurality of input registers, wherein each one of said second plurality of input registers is capable of transferring a received message from any one of said first plurality of microengines to a dedicated one of said second plurality of microengines.

4. The router as set forth in claim 3, wherein each of said second plurality of input registers comprises a full flag that is set when said any one of said first plurality of microengines writes said received message in said each of said second plurality of input registers.

5. The router as set forth in claim 4, wherein said full flag is cleared when said dedicated one of said second plurality of microengines reads said received message from said each of said second plurality of input registers.

6. The router as set forth in claim 1, wherein said plurality of registers comprises a first buffer capable of transferring a first data packet from said outbound network processor to said inbound network processor.

7. The router as set forth in claim 6, wherein said plurality of registers comprises a second buffer capable of transferring a second data packet from said outbound network processor to said inbound network processor.

8. The router as set forth in claim 6, wherein said first buffer comprises a full flag that indicates whether said first buffer is full.

9. The router as set forth in claim 7, wherein said second buffer comprises a full flag that indicates whether said second buffer is full.

10. A communication network comprising a plurality of routers that communicate data packets to one another and to interfacing external devices, each of said plurality of routers comprising:
a switch fabric; and
R routing nodes coupled to said switch fabric, each of said R routing nodes capable of exchanging data packets with said external devices and with other ones of said R routing nodes via said switch fabric, wherein a first of said R routing nodes comprises:
an inbound network processor comprising a first plurality of microengines capable of forwarding incoming data packets from external ports to said switch fabric;
an outbound network processor comprising a second plurality of microengines capable of forwarding outgoing data packets from said switch fabric to said external ports; and
a plurality of registers for transferring messages between said first plurality of microengines and said second plurality of microengines, said plurality of registers comprising a first plurality of input registers capable of transferring a received message from any one of said second plurality of microengines to a dedicated one of said first plurality of microengines, wherein each of said first plurality of input registers comprises a full flag that is set when said any one of said second plurality of microengines writes said received message in said each of said first plurality of input registers.

11. The communication network as set forth in claim 10, wherein said full flag is cleared when said dedicated one of said first plurality of microengines reads said received message from said each of said first plurality of input registers.

12. The communication network as set forth in claim 10, wherein said plurality of registers further comprises a second plurality of input registers, wherein each one of said second plurality of input registers is capable of transferring a received message from any one of said first plurality of microengines to a dedicated one of said second plurality of microengines.

13. The communication network as set forth in claim 12, wherein each of said second plurality of input registers comprises a full flag that is set when said any one of said first plurality of microengines writes said received message in said each of said second plurality of input registers.

14. The communication network as set forth in claim 13, wherein said full flag is cleared when said dedicated one of said second plurality of microengines reads said received message from said each of said second plurality of input registers.

15. The communication network as set forth in claim 10, wherein said plurality of registers comprises a first buffer capable of transferring a first data packet from said outbound network processor to said inbound network processor.

16. The communication network as set forth in claim 15, wherein said plurality of registers comprises a second buffer capable of transferring a second data packet from said outbound network processor to said inbound network processor.

17. The communication network as set forth in claim 15, wherein first buffer comprises a full flag that indicates whether said first buffer is full.

18. The communication network as set forth in claim 16, wherein said second buffer comprises a full flag that indicates whether said second buffer is full.

19. For use in a routing node comprising 1) an inbound network processor comprising a first plurality of microengines that forward incoming data packets from external ports to a switch fabric and 2) an outbound network processor comprising a second plurality of microengines that forward outgoing data packets from the switch fabric to the external ports, a method of transferring messages between the first plurality of microengines and the second plurality of microengines comprising the steps of: writing a first message from any one of the second plurality of microengines to a first dedicated mailbox register associated with a first one of the first plurality of microengines; setting a first full flag associated with the first dedicated mailbox register; reading the first message from the first dedicated mailbox register into the first one of the first plurality of microengines; and clearing the first full flag.

20. The method as set forth in claim 19, further comprising the steps of: writing a second message from any one of the first plurality of microengines to a second dedicated mailbox register associated with a first one of the second plurality of microengines; setting a second full flag associated with the second dedicated mailbox register; reading the second message from the second dedicated mailbox register into the first one of the second plurality of microengines; and clearing the second full flag.

* * * * *

UNITED STATES PATENT AND TRADEMARK OFFICE
CERTIFICATE OF CORRECTION

PATENT NO. : 7,620,042 B2   Page 1 of 1
APPLICATION NO. : 11/015739
DATED : November 17, 2009
INVENTOR(S) : Wybenga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1369 days.

Signed and Sealed this

Fourteenth Day of December, 2010

David J. Kappos
*Director of the United States Patent and Trademark Office*